United States Patent [19] [11] 4,199,439
Gatsis [45] Apr. 22, 1980

[54] PROCESS FOR HYDROREFINING A HYDROCARBON UTILIZING A NON-STOICHIOMETRIC VANADIUM SULFIDE CATALYST

[75] Inventor: John G. Gatsis, Des Plaines, Ill.

[73] Assignee: UOP Inc., Des Plaines, Ill.

[21] Appl. No.: 26,474

[22] Filed: Apr. 2, 1979

[51] Int. Cl.$^2$ .............................................. C10G 23/02
[52] U.S. Cl. ............................... 208/215; 208/251 H; 208/254 H; 252/439
[58] Field of Search .................... 208/215, 213, 254 H, 208/251 H; 252/439

[56] References Cited

U.S. PATENT DOCUMENTS

| | | | |
|---|---|---|---|
| 3,619,410 | 11/1971 | Gleim | 208/215 |
| 3,622,497 | 11/1971 | Gleim | 208/215 |
| 3,622,498 | 11/1971 | Stolfa et al. | 208/215 |
| 4,139,453 | 2/1979 | Hutchings | 208/213 |

FOREIGN PATENT DOCUMENTS 1327635  8/1973  United Kingdom ..................... 208/215

Primary Examiner—George Crasanakis
Attorney, Agent, or Firm—James R. Hoatson, Jr.; John G. Cutts, Jr.; William H. Page, II

[57] ABSTRACT

A non-stoichiometric vanadium sulfide catalyst utilized in a process for hydrorefining a hydrocarbon feed stock is prepared by (1) contacting vanadium oxide with ammonium sulfide to form an ammonium salt of vanadium sulfide and (2) the salt is neutralized with an acid in a non-oxidative atmosphere to form the vanadium sulfide catalyst. The acid used in the neutralizing step may be sulfuric acid or carbonic acid and the non-oxidative atmosphere may be hydrogen or nitrogen.

6 Claims, No Drawings

PROCESS FOR HYDROREFINING A HYDROCARBON UTILIZING A NON-STOICHIOMETRIC VANADIUM SULFIDE CATALYST

BACKGROUND OF THE INVENTION

Crude petroleum oil, and the heavier hydrocarbon fractions and/or distillates obtained therefrom, generally contain nitrogenous and sulfurous compounds in large quantities. In addition, crude oil, and the heavier hydrocarbon fractions contain quantities of metallic contaminants which exert detrimental effects upon the catalyst utilized in various processes to which the crude oil or heavy hydrocarbon fraction is ultimately subjected. The most common metallic contaminants are nickel and vanadium, although other metals including iron, copper, etc., are often present. These metals may occur in a variety of forms; they may exist as metal oxides or as sulfides, introduced into the crude oil as metallic scale or particles in the form of soluble salts of such metals; usually, however, they exist in the form of organo-metallic compounds such as metal porphyrins and the derivatives thereof.

Although the metallic contaminants existing as oxide or sulfide scale may be removed, at least in part, by a relatively simple filtering technique, and the water-soluble salts are at least in part removable by washing and subsequent dehydration, a much more severe treatment is generally required to remove the organo-metallic compounds, and to the degree required in order that the resulting crude oil or heavy hydrocarbon fraction is suitable for further processing. In addition to the organo-metallic compounds, including metal porphyrins, crude oils contain greater quantities of sulfurous and nitrogenous compounds that are found in light hydrocarbon fractions such as gasoline, kerosene, light gas oil, etc. For example, a Wyoming sour crude, having a gravity of 23.2° API at 60° F., contains about 2.8% by weight of sulfur and about 2700 p.p.m. of total nitrogen. The nitrogenous and sulfurous compounds are converted, upon being subjected to a treating process, into hydrocarbons, ammonia, and hydrogen sulfide, the latter being readily removed from the system in a gaseous phase. Reduction in the concentration of the metallic contaminants is not as easily achieved, and to the extent that the crude oil or heavy hydrocarbon charge stock becomes suitable for further processing. Notwithstanding that the concentration of these compounds, such as metal porphyrins, is relatively small, for example, less than about 10 p.p.m., calculated as the elemental metal, subsequent processing techniques will be adversely affected thereby. For example, when a hydrocarbon charge stock containing metals in excess of about 3.0 p.p.m., is subjected to a cracking process for the purpose of producing lower-boiling components, the metals become deposited upon the catalyst employed, steadily increasing in quantity until such time as the composition of the catalytic composite is changed to the extent that undesirable results are obtained. That is to say, the composition of the catalytic composite, which is closely controlled with respect to the nature of the charge stock being processed and to the desired product quality and quantity, is changed considerably as the result of the deposition of the metallic contaminants onto the catalyst, the changed composite resulting in changed catalytic characteristics. Such an effect is undesirable with respect to the cracking process, since the deposition of metallic contaminants upon the catalyst tends to result in a lesser quantity of valuable liquid product, and large amounts of hydrogen and coke, the latter producing relatively rapid catalyst deactivation. The presence of organic metal compounds, including metal porphyrins, affects deleteriously other processes including catalytic reforming, isomerization, hydrodealkylation, etc.

In addition to the foregoing described contaminating influences, crude oils and other heavier hydrocarbon fractions, generally contain large quantities of pentane-insoluble material. For example, the Wyoming sour crude consists of about 8.3% by weight of pentane-insoluble asphaltenes which are hydrocarbonaceous compounds considered as coke-precursors having the tendency to become immediately deposited within the reaction zone and onto the catalytic composite employed in the form of a gummy hydrocarbonaceous residue. This constitutes a large loss of charge stock; it is economically desirable to convert such asphaltenes into useful hydrocarbon oil fractions.

The object of the present invention is to provide a much more efficient process for hydrorefining heavier hydrocarbonaceous material and particularly petroleum crude oils, utilizing a catalyst prepared in a particular manner. As hereinabove set forth, the prior art has removed metals by deposition of the same on the catalyst employed. This greatly increases the amount of catalyst in a very short time, and precludes the use of a fixed-bed catalyst system. Slurry processes, employing catalytically active metals deposited upon silica and/or alumina, are extremely erosive, and make plant maintenance difficult and expensive.

OBJECTS AND EMBODIMENTS

The present invention teaches the preparation of a colloidally dispersed, unsupported catalyst useful in a slurry process, and which will not effect extensive erosion of the reaction system. The present process yields a liquid hydrocarbon product which is more suitable for further processing without experiencing the difficulties otherwise resulting from the presence of the hereinabove described contaminants. The process of the present invention is particularly advantageous in effecting the removal of the organic metal compounds without significant product yield loss, while simultaneously converting pentane-insoluble material into pentane-soluble liquid hydrocarbons.

In a broad embodiment, the present invention involves a method of preparing a non-stoichiometric vanadium sulfide catalyst utilized in hydrorefining a hydrocarbon charge stock.

A more limited embodiment of the present invention affords a process for hydrorefining a hydrocarbon charge stock which comprises admixing said charge stock with non-stoichiometric vanadium sulfide catalyst which is prepared according to the following method: contacting vanadium oxide with ammonium sulfide at a temperature and pressure sufficient to form an ammonium salt of the vanadium sulfide; neutralizing the resulting ammonium salt of the vanadium sulfide derived from step (a) with an acid in a non-oxidative atmosphere; and recovering a vanadium sulfide catalyst.

SUMMARY OF THE INVENTION

From the foregoing embodiments, it is readily ascertained that the method of the present invention involves the preparation of a non-stoichiometric vanadium sulfide catalyst. The catalyst, prepared in accordance with the method of the present invention comprises vanadium which is derived from vanadium oxide. A suitable vanadium oxide which may be used as the vanadium catalyst precursor is $V_2O_5$. The catalyst is prepared by initially contacting the vanadium oxide with ammonium sulfide to form an ammonium salt of the vanadium sulfide. The resulting ammonium salt of the vanadium sulfide is neutralized with an acid, for example sulfuric acid, in a non-oxidative atmosphere and vanadium sulfide catalyst is recovered. Any suitable non-oxidative atmosphere may be used to insure that the vanadium remains in the sulfide form. The preferred non-oxidative atmospheres include hydrogen or nitrogen. Any suitable acid may be used but preferred acids include carbonic acid and sulfuric acid.

The resulting vanadium sulfide catalyst is colloidally dispersed with a hydrocarbon feedstock preferably containing asphaltenes and organo-metallic compounds and passed to a suitable reaction zone at a temperature within the range of from about 400° F. to about 1000° F. under a hydrogen pressure within the range of about 500 to about 5000 p.s.i.g. The process may be conducted in a batch-type procedure or in a enclosed vessel through which the colloidal suspension is passed. When effected in a continuous manner, the process may be conducted in either upward flow or downflow. The normally liquid hydrocarbons are separated from the total reaction zone effluent by any suitable means, for example, through the use of a centrifuge, the resulting catalyst sludge being recycled to the reaction zone together with fresh hydrocarbon feedstock. The ammonia and hydrogen sulfide resulting from the destructive conversion of sulfurous and nitrogenous compounds contained within the hydrocarbon charge stock, are removed, along with any light paraffinic hydrocarbons including methane, ethane, and propane, in gaseous phase.

The following example is given to illustrate the process of the present invention and the effectiveness thereof in removing nickel and vanadium from the petroleum crude oil, and in converting pentaneinsoluble asphaltenes while simultaneously effecting the conversion of sulfurous and nitrogenous compounds into sulfur and nitrogen-free hydrocarbons. It is not intended that the present invention be unduly limited to the illustrations such as feedstock and operating conditions employed within the example.

EXAMPLE

The crude oil employed to illustrate the benefits afforded through the utilization of the present invention is a Wyoming sour crude oil having a gravity of 23.2° API at 60° F., and containing 2.8% by weight of sulfur, approximately 2700 ppm of nitrogen, 18 ppm of nickel and 71 ppm of vanadium as metal porphyrins, computed as the elemental metal. In addition, the sour crude consisted of 8.4 percent by weight of pentane-insoluble asphaltenes. As hereinafter indicated, the process of the present invention effects the conversion of a significant proportion of such asphaltenes, and to the degree that the same no longer exert a detrimental effect upon further processing.

The colloidally dispersed non-stoichiometric vanadium sulfide catalyst is prepared by the method of the invention and thereafter subjecting the mixture of catalyst and hydrocarbon feedstock to conversion in a rocking autoclave maintained at about 750° F. at an imposed hydrogen pressure of about 200 atmospheres. The colloidal suspensions remained in the autoclave at the foregoing conditions for a period from about 4 to about 8 hours.

About 15 grams $V_2O_5$ is contacted with ammonium sulfide to form an ammonium salt of the vanadium sulfide at a temperature of about 300° F. The resulting ammonium salt of the vanadium sulfide is neutralized with carbonic acid in a non-oxidative atmosphere and about 15 grams of vanadium sulfide catalyst is recovered.

The resulting vanadium sulfide is admixed with 200 grams of the hereinabove described Wyoming sour crude oil. The crude oil and catalyst mixture is placed in a rocker autoclave under a pressure of 1500 psig of hydrogen and then heated to 750° F. These conditions are maintained for a period of 4 hours and the resulting normally liquid product effluent contains 124 ppm nitrogen, 0.02 percent by weight of sulfur, less than 0.1 weight percent pentane-insoluble asphaltenes, less than 0.04 ppm nickel and less than 0.04 ppm vanadium.

The foregoing specification and example clearly illustrate the advantage afforded the hydrorefining of petroleum crude oils through the utilization of the method of the present invention. It is of particular interest to note that the concentration of nickel and vanadium, existing as organo-metallic complexes, as well as pentane-insoluble asphaltenes, was decreased to a level permitting subsequent utilization of the crude oil, either for further processing or distillation, and further that at least a portion of the crude oil was converted into lower-boiling hydrocarbon products.

I claim as my invention:

1. A process for hydrorefining a hydrocarbon charge stock which comprises reacting an admixture of said charge stock with hydrogen and with a colloidally dispersed non-stoichiometric vanadium sulfide catalyst which is prepared according to the following method:
   (a) contacting vandaium oxide with ammonium sulfide at a temperature and pressure sufficient to form an ammonium salt of the vanadium sulfide;
   (b) neutralizing with an acid, the resulting ammonium salt of the vanadium sulfide derived from step (a) in a non-oxidative atmosphere to form said vanadium sulfide catalyst; and
   (c) passing said vanadium sulfide catalyst from step (b) to form said admixture with said charge stock and hydrogen.

2. The process of claim 1 wherein said hydrocarbon charge stock contains pentane-insoluble asphaltenes.

3. The process of claim 1 wherein said non-oxidative atmosphere comprises hydrogen.

4. The process of claim 1 wherein said non-oxidative atmosphere comprises nitrogen.

5. The process of claim 1 wherein said acid is carbonic acid.

6. The process of claim 1 wherein said acid is sulfuric acid.

* * * * *